US006891791B1

(12) United States Patent
Gutin

(10) Patent No.: US 6,891,791 B1
(45) Date of Patent: May 10, 2005

(54) OPTICAL PICKUP APPARATUS AND METHOD

(75) Inventor: Mikhail Gutin, Albany, NY (US)

(73) Assignee: InterScience, Inc., Troy, NY (US)

( * ) Notice: Subject to any disclaimer, the term of this patent is extended or adjusted under 35 U.S.C. 154(b) by 109 days.

(21) Appl. No.: 09/643,046

(22) Filed: Aug. 21, 2000

Related U.S. Application Data

(60) Provisional application No. 60/149,856, filed on Aug. 19, 1999.

(51) Int. Cl.$^7$ ............................................. G11B 7/00
(52) U.S. Cl. .............................. 369/112.01; 369/112.03
(58) Field of Search .................. 369/112.01, 112.02, 369/112.03, 112.1, 112.15, 112.22, 44.11, 44.23, 44.24

(56) References Cited

U.S. PATENT DOCUMENTS

| 4,945,529 A | | 7/1990 | Ono et al. |
| 5,049,732 A | | 9/1991 | Nagahama et al. |
| 5,128,914 A | | 7/1992 | Kurata et al. |
| 5,231,620 A | | 7/1993 | Ohuchida |
| 5,412,631 A | | 5/1995 | Komma et al. |
| 5,627,805 A | | 5/1997 | Finkelstein et al. |
| 5,638,353 A | * | 6/1997 | Takahashi .............. 369/112.07 |
| 5,652,746 A | | 7/1997 | Heiman |
| 5,701,283 A | | 12/1997 | Alon et al. |
| 5,717,674 A | | 2/1998 | Mori et al. |
| 6,088,310 A | | 7/2000 | Yanagawa |
| 6,115,345 A | | 9/2000 | Kato et al. |

* cited by examiner

Primary Examiner—Nabil Hindi
(74) Attorney, Agent, or Firm—Jay R. Yablon; Michelle D. Simkulet

(57) ABSTRACT

The present invention provides an improved optical pickup device based on the developing electronically reconfigurable diffraction grating MEMS technology. The improved optical pickup device has applications that include but are not limited to CD and DVD for audio, video and computer technology. The present invention can provide improvements to this current and future technology with higher data storage density and faster retrieval. In a preferred embodiment, the optical pickup apparatus comprises an electronically reconfigurable diffraction grating modulating relative light intensities as among at least two different diffraction orders of light diffracted by the electronically reconfigurable diffraction grating; focusing optics for focusing the light diffracted by the electronically reconfigurable diffraction grating into diffractive spots corresponding with each of the diffraction orders and onto an optical storage medium, which light is then reflected by the optical storage medium; and a detector for detecting the light reflected by the optical storage medium and striking said detector.

45 Claims, 13 Drawing Sheets

OPTICAL PICKUP APPARATUS AND METHOD

CROSS-REFERENCE TO RELATED APPLICATION

This application claims the benefit of U.S. Provisional Application No. 60/149,856, filed Aug. 19, 1999.

FIELD OF THE INVENTION

This invention relates to the field of optical pickup devices, and particularly to electronically-controlled optical pickup devices.

BACKGROUND OF THE INVENTION

Various configurations and implementations of electronically reconfigurable diffraction gratings fabricated using MEMS technology are disclosed, for example, in U.S. Pat. No. 5,841,579 by Bloom, et al.; U.S. Pat. No. 5,757,536 by Ricco, et al.; and U.S. Pat. No. 5,999,319 by Castracane. These MEMS-based electronically reconfigurable diffraction gratings offer new and unique degrees of freedom in controlling diffraction of light from a grating, bringing qualitatively new potential to this centuries-old optical device.

The primary advantage provided by these reconfigurable diffraction gratings is the elimination of mechanical tuning and the advent of dynamic control and programmable tuning of the diffraction pattern. The practical applications of this device, however, have been limited so far. This device has found applications mainly in spectroscopy and digital display applications. As will be disclosed herein, a novel and nonobvious application of the electronically reconfigurable diffraction grating is to an improved optical pickup device that can be implemented in CD players, DVD players, computer storage devices, and laser based surface profilometers.

A typical layout of an existing optical pickup device, for example, in a CD player, is shown in FIG. 1. A solid state laser diode 102, typically emitting in the near IR, emits optical power in a wedge shaped beam with a typical divergence of 10×30 degrees in the X and Y directions, respectively. A diffraction grating 104 splits the output laser beam into a main (zero order) beam 106 and two ($1^{st}$ order) side beams designated as first $1^{st}$ order side beam 108 and second $1^{st}$ order side beam 110. In these existing prior art devices, only the zero and first order beams (106, 108 and 110 respectively) are used. The higher order beams (second order and above) are not used. The zero order beams are used to read content information, e.g., music, video, computer data, etc., from the disk. The $1^{st}$ order side beams 108 and 110 are used for tracking the track on the disk which is being read (tracking information). The tracking servo mechanism in a typical CD player or other device that would use an optical pickup, maintains the $1^{st}$ order side beams 108 and 110 by keeping the amplitude of the reflection of these two $1^{st}$ order side beams 108 and 110 equalized, as measured by the system's photodetector in a feedback loop arrangement.

Next, the laser beam passes through a polarizer 111, polarizing beam splitter 112, a turning mirror 118, a collimating lens 114, a quarter wave plate 116, and the objective lens 120 before reaching the optical storage media disk 122 (compact, digital video, etc.). The collimated laser beams (the main zero order beam 106 and the two $1^{st}$ order side beams 108 and 110) pass through the objective lens 120 and are focused to diffraction-limited spots on the information layer of the disk, known as the pits. The reflected beam retraces the original path up until it passes through the polarizing beam splitter 112 at which point it is diverted toward the photodetector array 124. Additional focusing optics 126 are used to focus the reflected main zero order beam 106 on the quadrant photodetector 128 and the $1^{st}$ order side beams on individual photodetectors 130, located on the side of the quadrant detector 128 in the photodetector array 124, as shown in FIG. 3.

For reference, FIG. 2 shows a typical recorded fragment on a CD or alternative optical storage media. Shown in FIG. 2 are the pits 232 and the coast 234. The pits 232 comprise the information content storage layer of the disk and are where the main zero order beam 106 is focused to. Assuming the optical storage media 450 is round, a pit line 233 would contain all pits 232 located at the same radius and is represented in FIG. 2 as the dotted line through the center of laterally adjacent pits. Similarly, the coast 234 is defined as the area between adjacent pits 232 both laterally and longitudinally. The coast line 235 is defined as the median line equidistant between successive pit lines 233. The typical width of the pits 232 is 0.5 micron (shown as the vertical distance 231 across the pit) and the pitch is 1.5 micron (defined as the distance between pits lines 233 and shown as the vertical distance 237) which makes the width of the coast 234 1 micron (shown as vertical distance 239). This is where the $1^{st}$ order side beams 108 and 110 are focused to.

As mentioned above, the photodetector array 124 typically comprises a quadrant photodetector 128 (labeled A, B, C, D) and two individual photodetectors 130 (labeled E and F) that are located on the wide extremes of the quadrant detector 128. For reference, this photodetector array configuration is shown in FIG. 3 along with the typical reflected beams. The individual photodetectors 130 located on the wide extremes are typically used to detect and measure the reflected $1^{st}$ order side beams 108 and 110, while the quadrant detector 128 is used to measure the reflected zero order beam 106.

The two reflected $1^{st}$ order beams 108 and 110 are used for horizontal tracking. When the focal spot shifts sideways from the center of the pits 232, one of the side spots starts leaving the coast 234 and covering some of the pit 232 area creating an obvious change in reflected intensity. The resulting difference in the signals from the two individual photodetectors 130 is used as an error signal in the feedback loop for horizontal tracking. The width of the coast 234 is typically twice the width of the pits 232, as shown in FIG. 2, to provide for the differential feedback signal.

The reflected zero order beam 106 is used in a feedback configuration to establish focus on the pit 232 of the optical storage media 450 for information content readout. When in focus, the reflected zero order beam 106 is circular on the quadrant photodetector 128 as shown in FIG. 3. When out of focus in one direction, the reflected zero order 106 is diagonally elliptical across quadrants B and C as shown in FIG. 3a, while being out of focus in the opposite direction produces an ellipse across quadrants A and D, as shown in FIG. 3b. The focus is maintained by sampling the intensities of the diagonal quadrants and comparing. In other words, the sum of the intensities of quadrants B and C is compared to the sum of the intensities of quadrants A and D in a feedback loop in order to maintain focus.

This method of signal detection and processing limits the technology to non-overlapping diffraction limited reflections on the photodetector 128. Any overlap in the zero and +/−first order reflected beams (106, 108, 110), would skew the signals to the photodetector 128, and thereby falsify the horizontal tracking and information focusing feedback. Therefore, the prior art technology is limited in optical storage density to a configuration that provides diffraction limited nonoverlapping signals to the photodetector 128.

The prior art technology, as described above, is further limited to using only the diffracted energy in the zero and first orders, in addition to being limited to nonoverlapping reflections on the readout device. This technology is described, for example, in U.S. Pat. Nos. 5,717,674; 5,475,670; 5,412,631; 5,231,620, 5,128,914, and 5,094,732. These patents teach multiple ways of implementing optical pickup devices utilizing three signals, one from the zero diffractive order and one from each the +/−first orders. In order to increase both the optical storage density and optical readout speed, improvements in the method of signal processing must be realized to overcome these existing limitations.

OBJECTS OF THE INVENTION

Therefore, it is desirable to provide an improved optical pickup device and method utilizing the advantages of an electronically reconfigurable diffraction grating.

It is also desirable to provide an improved optical pickup device and method with increased storage density and increased readout speed over the prior art.

It is also desirable to provide an improved optical pickup device and method that utilizes the zero order, +/− first orders and higher diffractive orders in the readout of optical storage devices.

It is also desirable to provide an improved optical pickup device and method which can utilize overlapping diffraction orders, thereby allowing information on an optical disk to be stored more compactly and read more rapidly.

It is also desirable to provide an improved optical pickup device and method that improves the readout speed at which optical disks are read.

SUMMARY OF THE INVENTION

The present invention applies an electronically reconfigurable grating in an optical pickup, offering higher-data storage density and faster retrieval in the future generations of CD and DVD technology, for audio, video, and computer applications. Currently, optical pickup devices are common to CD and DVD reader technology, however, the present invention is not limited to those devices. All applications of optical pickup devices, current and future, would benefit from the present invention.

In a preferred embodiment, the optical pickup apparatus comprises an electronically reconfigurable diffraction grating modulating relative light intensities as among at least two different diffraction orders of light diffracted by the electronically reconfigurable diffraction grating; focusing optics for focusing the light diffracted by the electronically reconfigurable diffraction grating into diffractive spots corresponding with each of the diffraction orders and onto an optical storage medium, which light is then reflected by the optical storage medium; and a detector for detecting the light reflected by the optical storage medium and striking said detector.

BRIEF DESCRIPTION OF THE DRAWINGS

The features of the invention believed to be novel are set forth in the associated claims. The invention, however, together with further objects and advantages thereof, may best be understood by reference to the following description taken in conjunction with the accompanying drawings in which:

FIG. 7b shows the light distribution on the photodetector corresponding to the alternative embodiment shown in FIGS. 7 and 7a.

DETAILED DESCRIPTION

Figure 4:
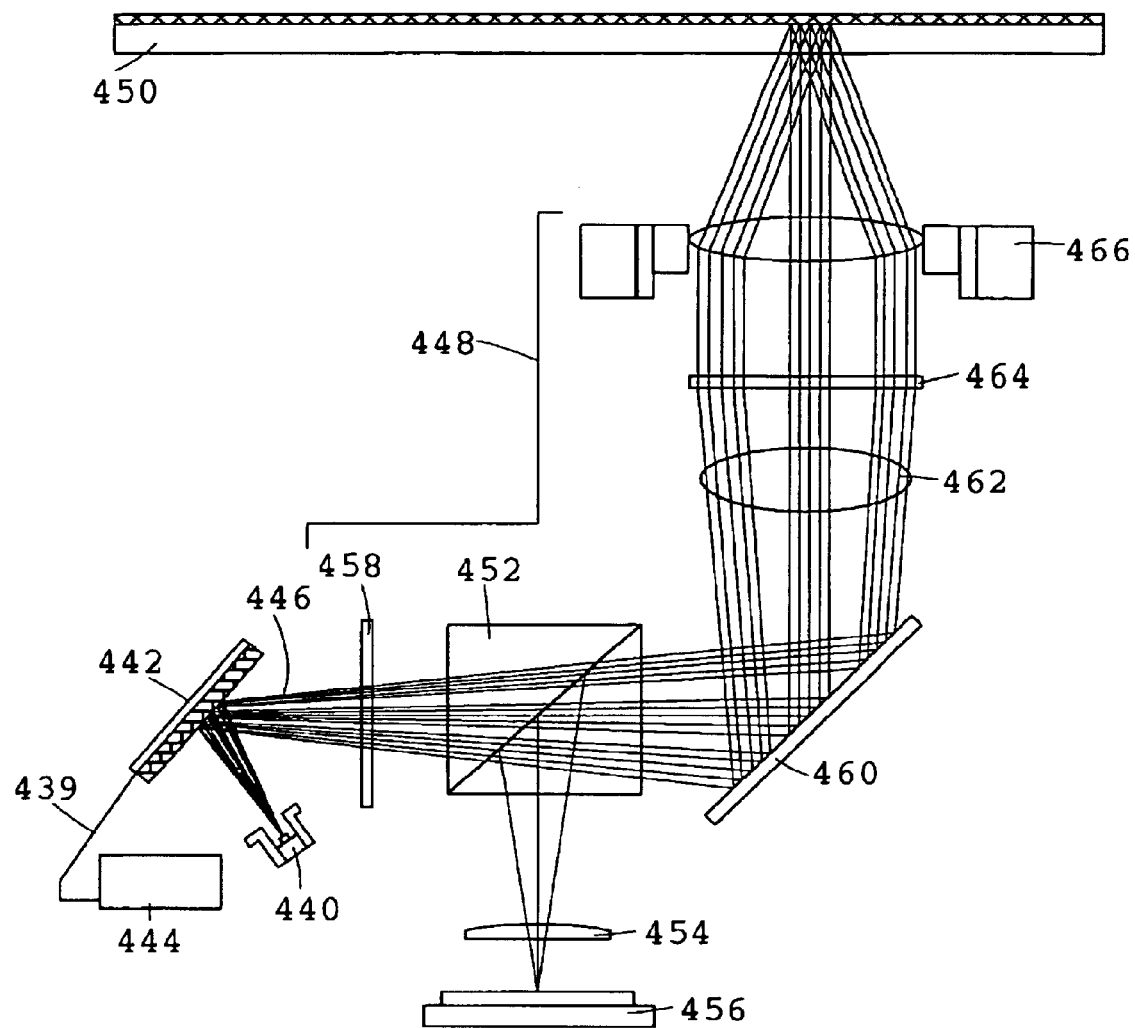
FIG. 4 is a schematic of the light path of the improved optical pickup device utilizing a reconfigurable diffraction grating in reflection mode.

The present invention is an improved optical pickup device that incorporates an electronically reconfigurable diffraction grating utilizing the zero order and multiple higher diffractive orders. The present invention has new degrees of freedom which can offer many advantages compared to existing optical pickup technology. The main expected useful results are increased data storage density and readout speed. These implementations are not possible using a conventional diffraction grating and can only be realized by the optical pickup device that includes an electronically reconfigurable diffraction grating 442 as described. FIG. 4 shows a schematic of the improved optical pickup device implemented with an optical delivery system similar to the prior art to allow for easy comparison. It is a schematic of the light path of the preferred embodiment of the improved optical pickup device, though variations can be achieved by someone of ordinary skill within the scope of this disclosure and its associated claims.

A laser diode light source 440 illuminates an electronically reconfigurable diffraction grating 442 that receives an input signal from the control system 444. The multiple orders of diffracted light 446 are collected by the delivery and focusing optics 44B, and focused onto the optical storage media 450 for data retrieval (pickup). The reflected light is returned through the same optical train and diverted by the polarizing beamsplitter 452 through additional focusing optics 454 onto a photodetector array 456. Each of these main components will now be described in more detail.

The laser diode 440, as described in the prior art, is typically a solid state laser diode emitting in the near IR, that emits optical power in a wedge shaped beam with a typical divergence of 10×30 degrees in the X and Y directions, respectively. These are the typical light sources found in such optical pickup devices due to their reliability, low power consumption and long lifetime attributes.

Figure 4A:
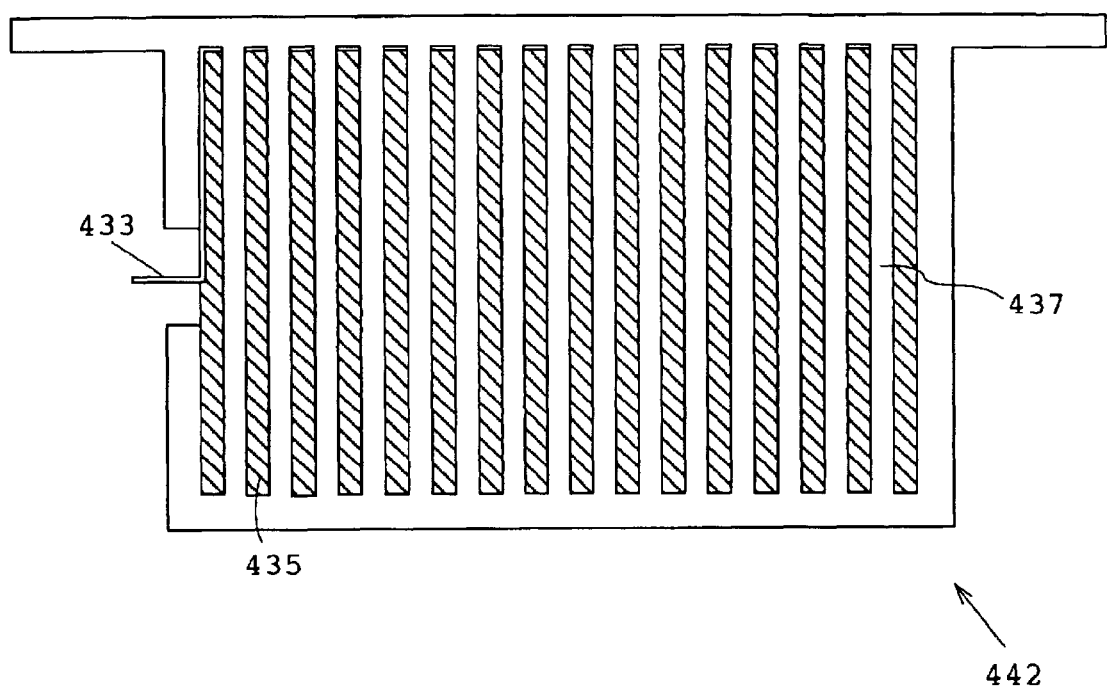
FIG. 4a is a reflection type reconfigurable diffraction grating.

The electronically reconfigurable diffraction grating 442 is a programmable device, typically fabricated using microelectromechanical systems (MEMS) technology, which allows the user fine control over the spatial distribution of light intensity in the diffraction pattern. A typical reconfigurable diffraction grating 442 is shown in FIG. 4a. As shown in the figure, the array of rulings 437 are separated by equal ruling spacings 435 and are individually addressable by the common electrode 433 that runs underneath either every ruling 437 or under a periodic distribution of the rulings 437 (every other, every third, every fifth, etc.). The spatial distribution of light intensity is controlled by a voltage applied to each ruling 437 of the grating. The control system 444 applies a series of preprogrammed voltages to the grating to achieve the desired grating rulings 437 configuration and switching sequence. Programming a series of voltages allows automated processing at various spatial distributions. The pathway 439 between the reconfigurable diffraction grating 442 and the control system 444 is a two way pathway to provide feedback to the control system. Switching becomes automated with the electronically reconfigurable diffraction grating 442, as opposed to the mechanical tuning required to adjust a conventional grating element.

The inclusion of the electronically reconfigurable diffraction grating 442 significantly increases the number of degrees of freedom in controlling the diffracted of light over the conventional diffraction grating technology. Incorporated into the present invention of the improved optical pickup device, the electronically reconfigurable diffraction grating provides additional processing capabilities, which result in higher speed of information retrieval and recording, as well as increased storage density.

Figure 4B:
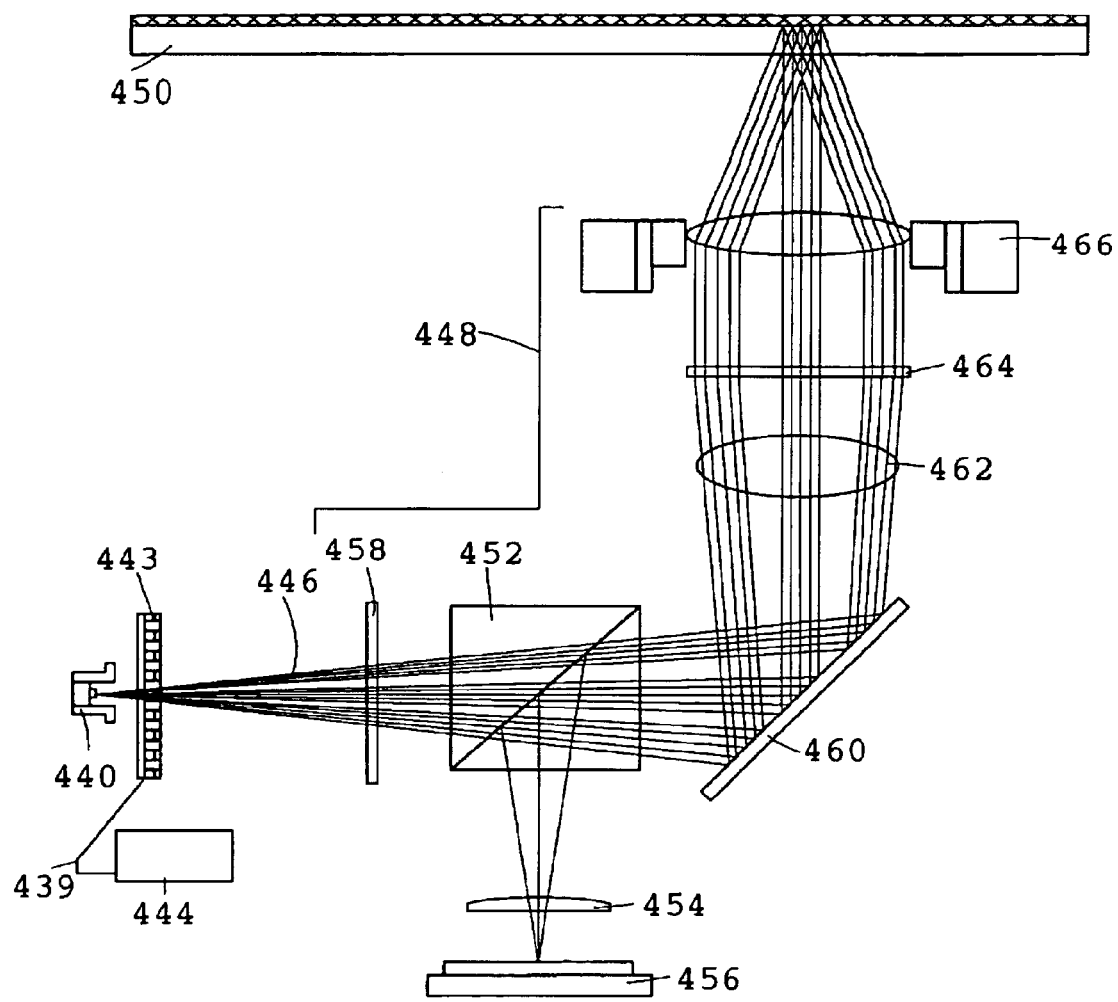
FIG. 4b is a schematic of the light path of the improved optical pickup device utilizing a reconfigurable diffraction grating in transmission mode.

The reconfigurable grating 442 is illustrated in reflection mode, but technological advances in MEMS-based grating designs could provide a transmission grating that can be used in future implementations of the present invention. It is understood that the illustrated reflection-mode reconfigurable diffraction grating 442 can be replaced with a transmission-mode reconfigurable diffraction grating as this technology is improved, in a configuration such as is illustrated by FIG. 4b, which shows an alternative embodiment of the present invention in which the grating element is an electronically reconfigurable transmission diffraction grating 443. All other elements of the invention remain the same as shown in the preferred embodiment in FIG. 4. The purpose, functionality and implementation of the transmission type grating 443 would be the same as presented with the reflection type grating 442 in the preferred embodiment of the present invention.

Figure 1:
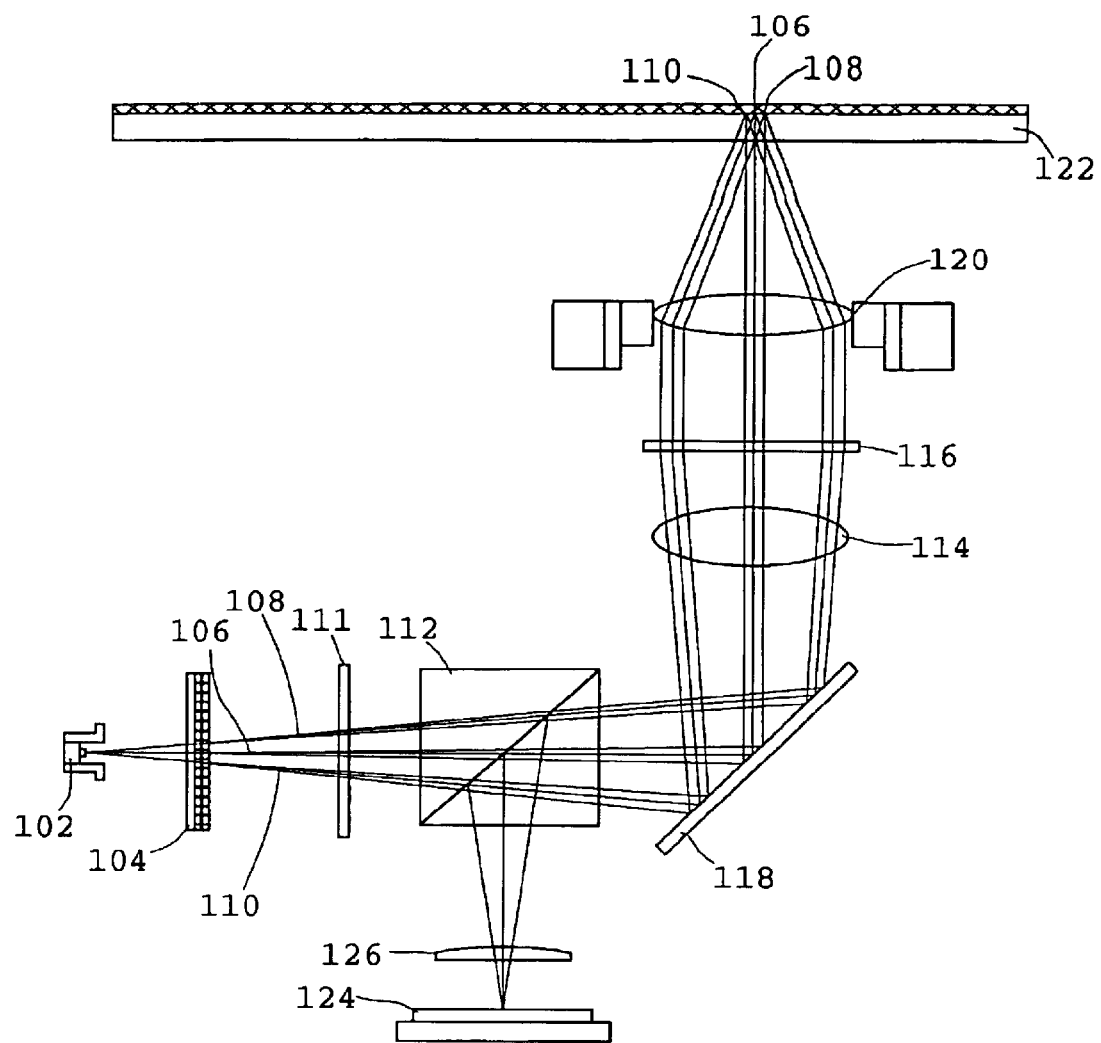
FIG. 1 is a detailed schematic of prior art optical pickup technology.

The optical delivery and focusing system 448 is designed specifically for the application in which the optical pickup device is used. The function of the optical delivery system 448 is to provide a focusing mechanism by which the diffracted light is focused on the optical storage media 450, typically including an automated focusing lens. It also typically provides a return path for the light reflected from the optical storage media 450. The optical delivery components in FIG. 1 (polarizer 111, beamsplitter 112, turning mirror 118, automated focusing lens 120, collimating lens 114 and quarter wave plate 116) show a typical arrangement of the optical delivery and focusing system implemented by prior art optical pickup devices in CD players/readers. The present invention may utilize functionally similar optical configurations but are not limited to identical configurations of the optical delivery and focusing system since the primary purpose is to provide a means of focusing the diffracted light and a return path for the reflected light. For means of easy comparison, however, FIG. 4 illustrates for a preferred embodiment, an optical delivery and focusing system 448 similar to that shown in FIG. 1. It comprises a polarizer 458, a polarizing beamsplitter 452, a turning mirror 460, a collimating lens 462, a quarter wave plate 464 and an automatic focusing lens 466.

Figure 2:
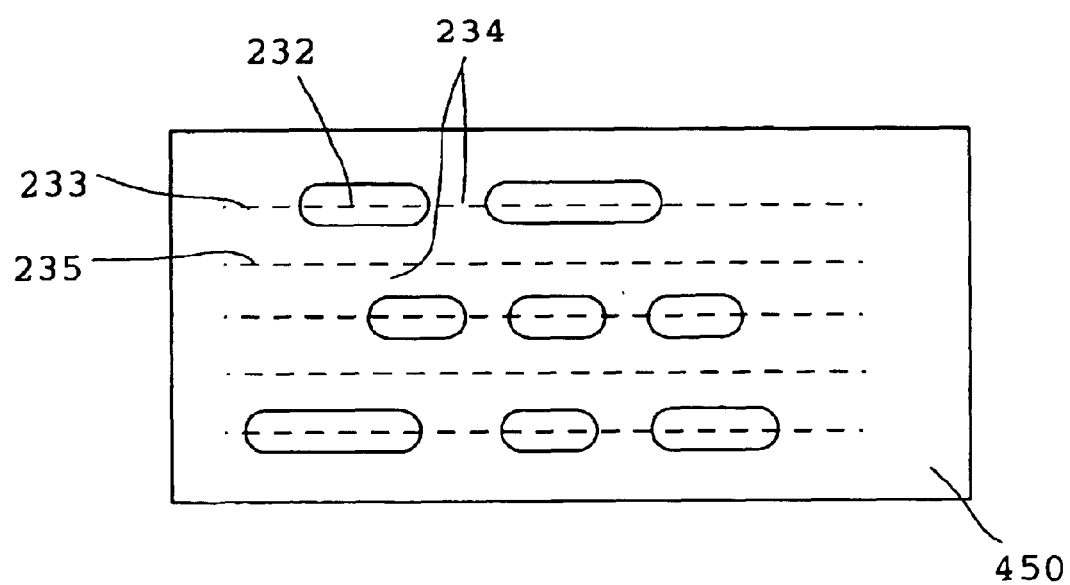
FIG. 2 is a zoomed view schematic of a typical fragment of a recording on an optical disk.
Figure 3:
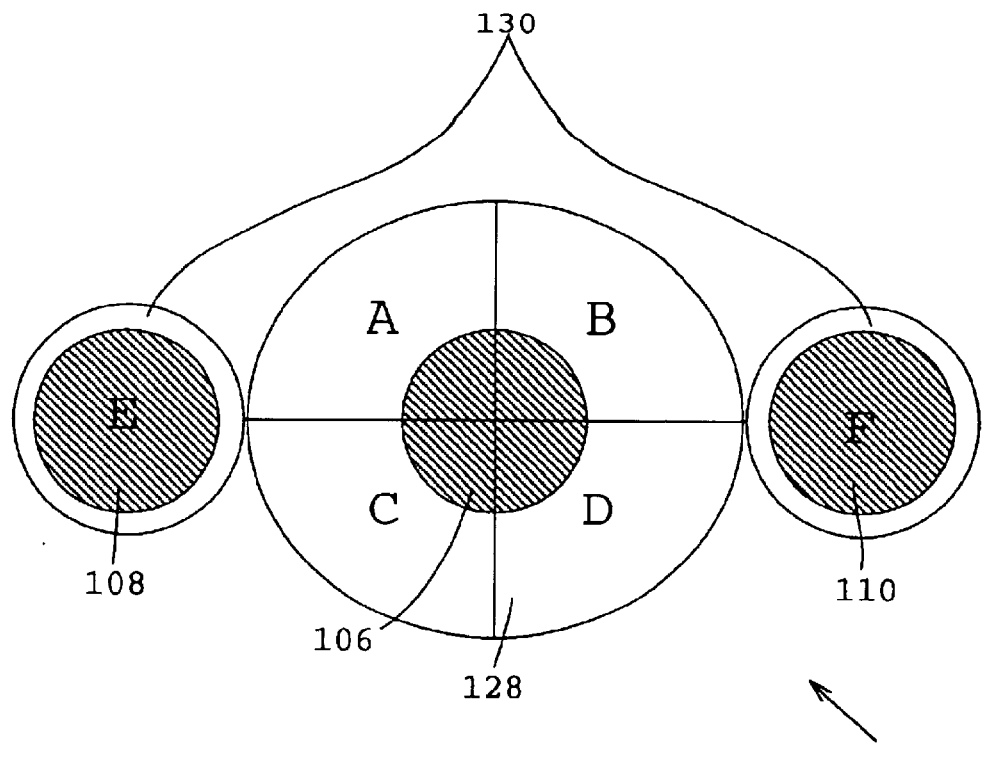
FIG. 3 is a top view of light reflected from an optical disk striking the photodetector array in focus according to the prior art.
Figure 3A:
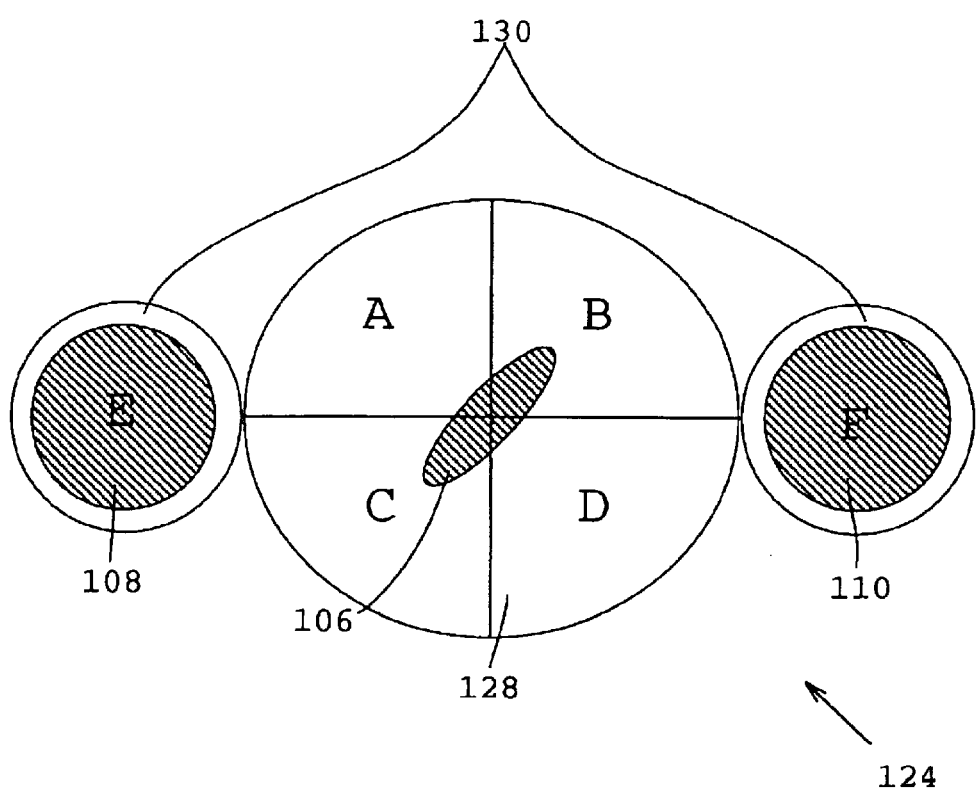
FIG. 3a is a top view of light reflected from an optical disk striking the photodetector array out of focus according to the prior art.
Figure 3B:
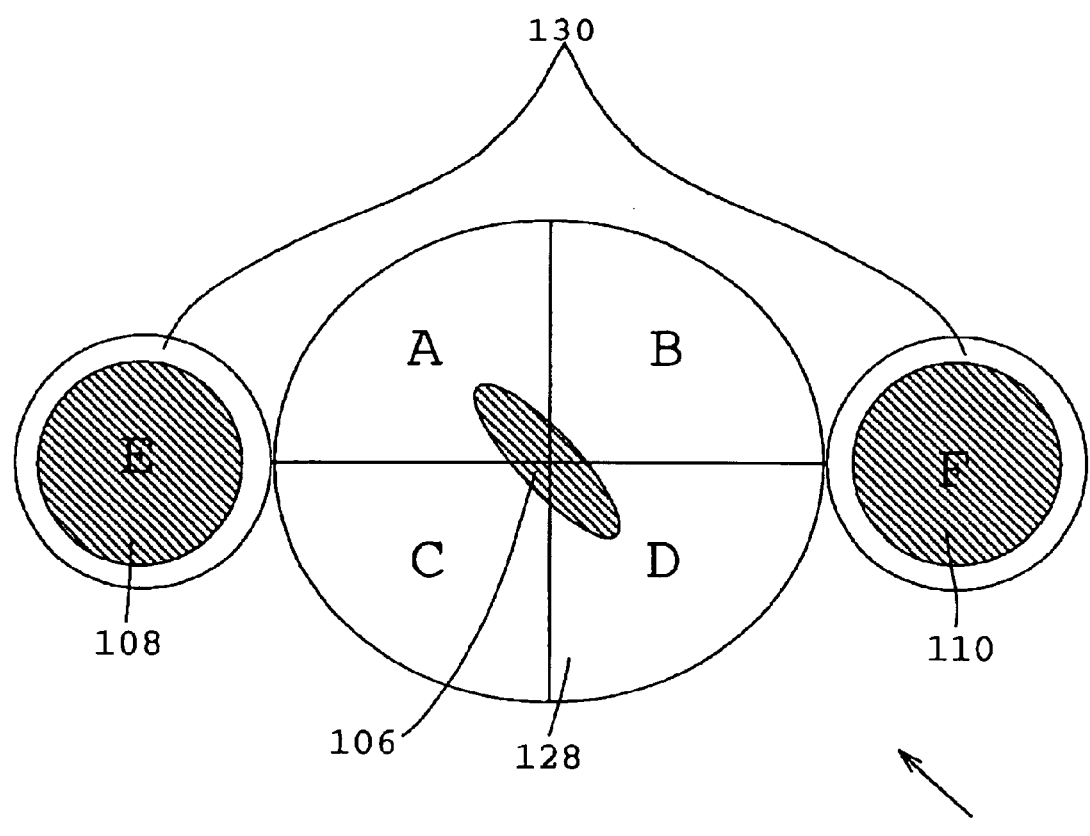
FIG. 3b is a top view of light reflected from an optical disk striking the photodetector array also out of focus according to the prior art.

The optical storage media 450 that typically utilize the optical pickup devices include CDs and DVDs for audio, video, and computer data storage. For reference, FIG. 2 shows a typical recorded fragment on optical storage media 450. Shown in FIG. 2 are the pits 232 and the coast 234. The pits 232 comprise the information content storage layer of the disk and are addressed by the pickup in order to read the content information stored on the optical disk. Typically the pits 232 are aligned along a track, and those aligned at the same radius from the center of the disk reside along the same pit line 233. The coast 234 is defined as the spacing between the adjacent pits 232, and is used for tracking. The coast line 235 which is equidistant between two radially successive pit lines 233, is addressed by the optical pickup to tracking information in order to locate the pit lines 233.

Figure 5:
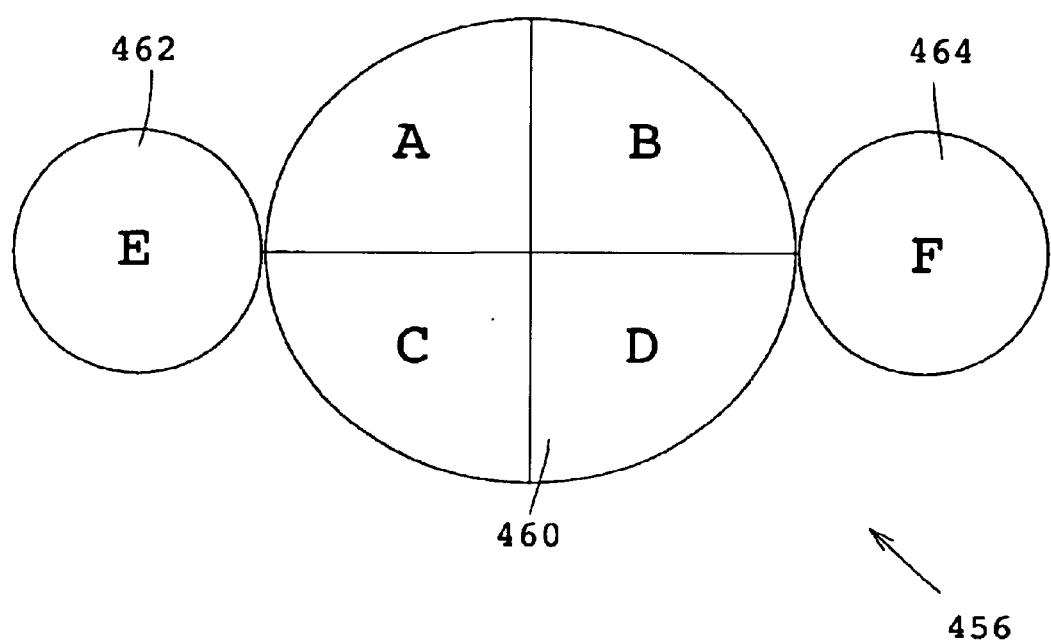
FIG. 5 is a top view light reflected from an optical disk striking the photodetector array according to several alternative preferred embodiments of the invention.

The reflected light collected from the optical storage media 450 is returned through the optical delivery system 448 and focused onto a photodetector array 456 for readout. Typically, the types of photodetector arrays 456 used are quadrant photodetectors that provide simple geometric arrangements of detection quadrants, such as shown in FIG. 5. FIG. 5 shows the top view of the photodetector array 456 incorporated in the improved optical pickup device. As shown in the figure, the photodetector array 456 is subdivided into a main array 460 with four quadrants (A, B, C, D) and two individual subarrays, 462 and 464 respectively, which lie on opposite sides of the main array 460.

The distribution of intensity between the diffracted orders of light is modulated at a frequency which is high compared to the data readout frequency. This dynamic control of the grating configuration is only possible by utilizing an electronically reconfigurable grating 442. As a result, scanning of the optical storage media 450 surface will take place in a stepwise fashion such that when the intensity of the diffracted light energy is concentrated in the higher orders, points farther from the center are mostly illuminated, and when the intensity of the diffracted light energy is concentrated in the zero order, the center is predominantly illuminated. The selection of the diffraction order that receives the majority of the light energy and therefore is mostly illuminated on the optical storage media 450 is defined by the voltage applied to the electronically reconfigurable grating 442, with programmable sequential voltage steps implemented by the control system 444. The selected diffraction order is therefore known and the individual diffraction orders do not need to be resolved in the image on the photodiode array 456. This allows the diffraction orders to partially overlap with one another without compromising the information readout, and leads to the capability for higher optical disk storage densities and faster information retrieval. Knowledge of the modulation of the intensity in individual diffraction orders, as implemented in the electronically reconfigurable diffraction grating 442 by the control system 444, is used to differentiate the signals at the photodetector array 456.

Figure 6:
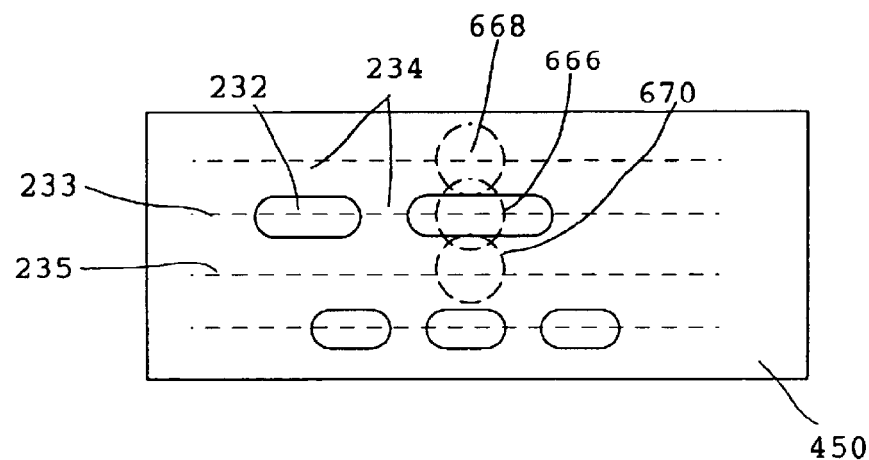
FIG. 6 is a schematic view of a preferred embodiment of the diffracted laser illumination of the optical storage media.

The light distribution on the optical storage media 450 is shown in FIG. 6. For simplicity of the figure, only zero and first order are shown, however second order and higher may also be included. The electronically controlled redistribution of light energy between the spots originating from different diffraction orders, namely zero order diffractive spot 666, +/−first order diffractive spots 668 and 670, is a variation of digital scanning of the optical storage media 450 surface across the pit line 233. If the storage density is so high that the pit 232 size and the coast 234 width is small compared to the diffractive focal spot sizes (666, 668, 670), the stored information can still be detected due to the modulation of the intensity of that specific diffracted order by the grating and the lateral and vertical tracking is still possible if the transverse scanning is fast compared to the readout frequency and a simple deconvolution technique is applied.

Figure 6A:
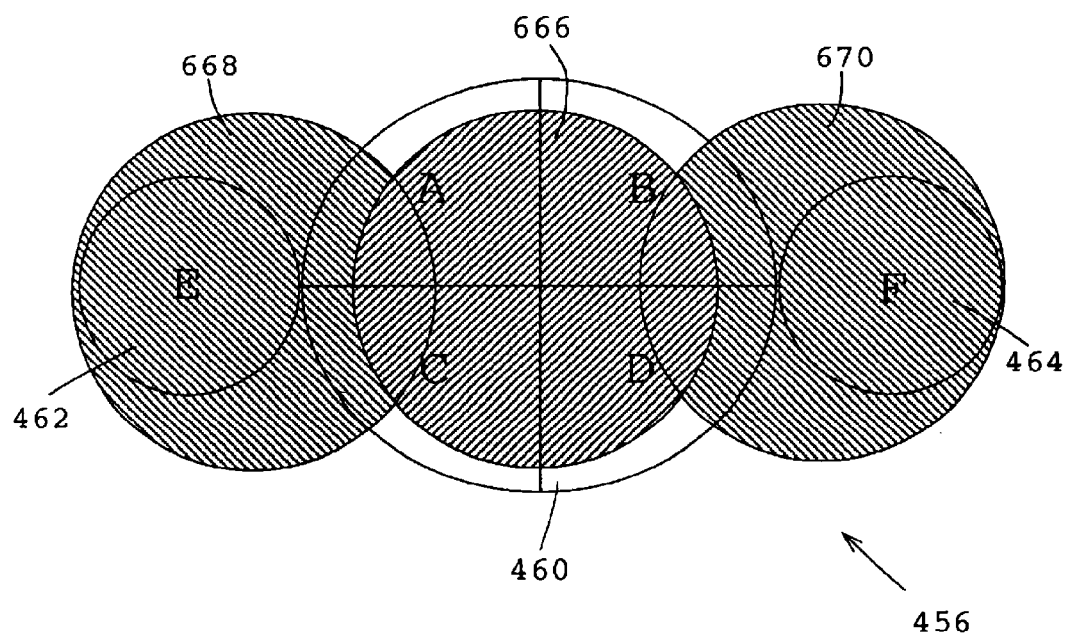
FIG. 6a shows the light distribution on the photodetector corresponding to the preferred embodiment shown in FIG. 6.

FIG. 6a shows the reflected diffractive focal spots (666, 668, 670) on the photodetector array 456. The selective modulation of the intensity of the diffractive focal spots (666, 668, 670) and subsequent processing by the photodetector 456 signals, features such as coast 234 of the optical storage media 450 can be resolved even if the diffraction-limited spots (666, 668, 670) overlap as illustrated in FIG. 6. The intensity modulation is achieved dynamically by repositioning the associated rulings 437 of the electronically reconfigurable grating 442. This improved processing technique allows for a higher storage density on the optical storage media 450 since that density is no longer limited by the size of the diffraction limited spots (666, 668, 670). Further, the need to optically differentiate these spots on, for example, the photodetector 456 is eliminated.

Figure 7:
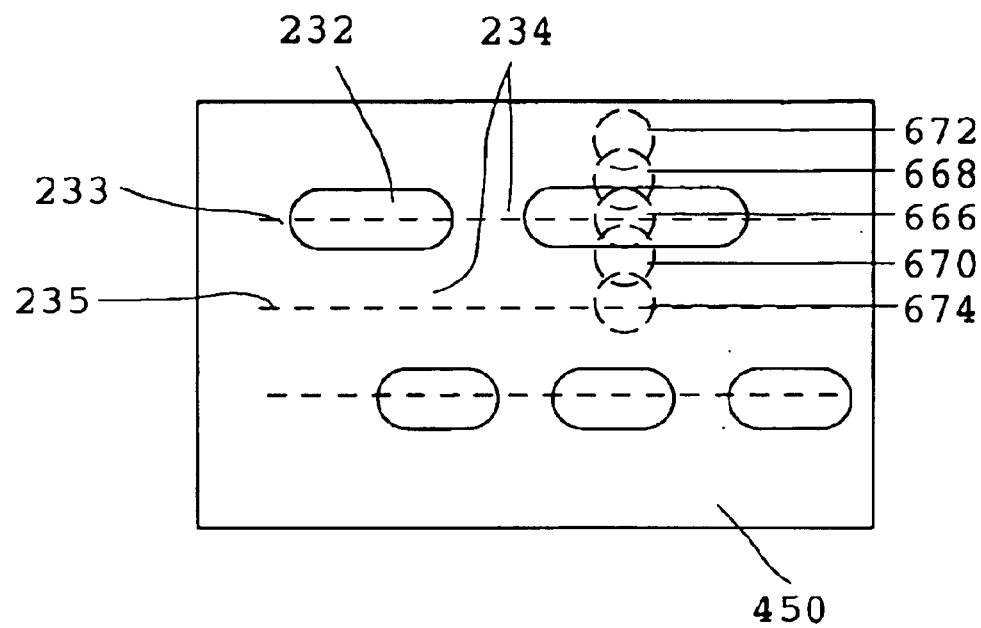
FIG. 7 is a schematic of an alternative implementation of the diffracted laser illumination of the optical storage media.
Figure 7A:
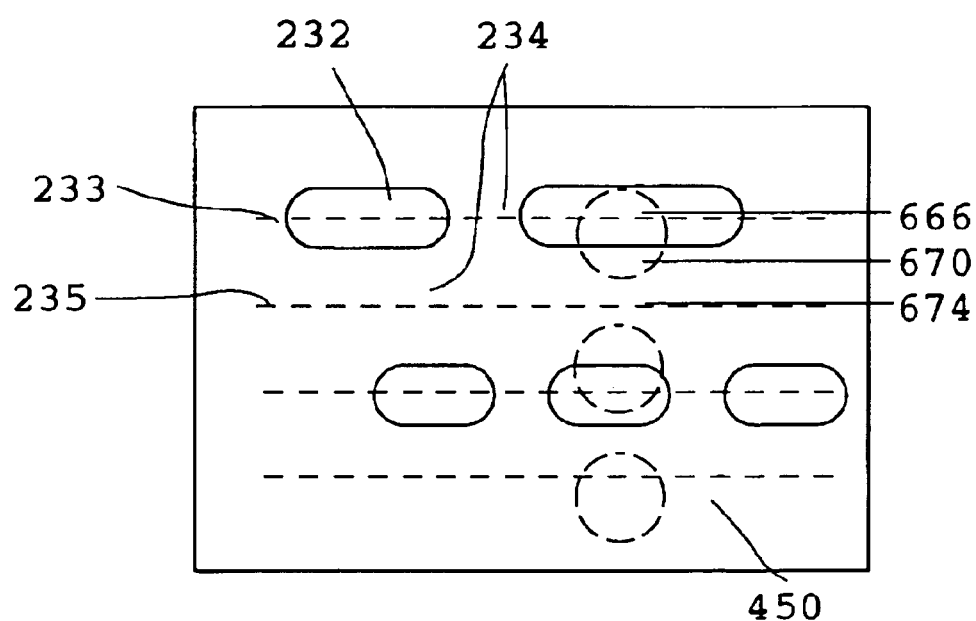
FIG. 7a is a secondary schematic of the alternative implementation of the diffracted laser illumination of the optical storage media shown in FIG. 7.
Figure 7B:
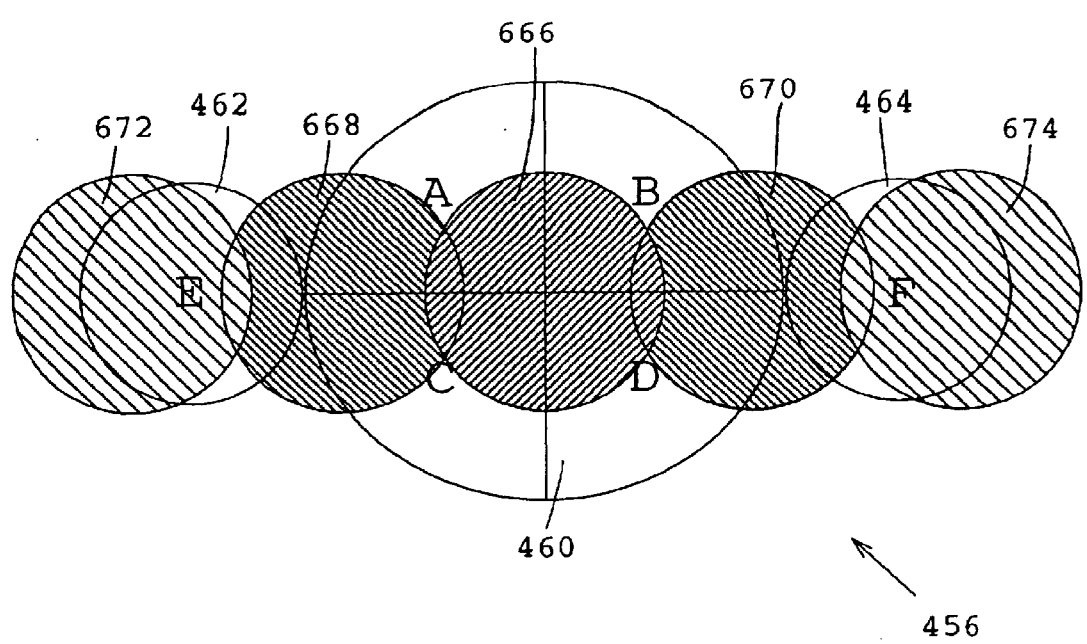

FIGS. 7 and 7a shows an alternative implementation of the preferred embodiment of the present invention. These embodiments essentially entail implementations of the present invention whereby a faster readout time is realized by utilizing multiple higher orders simultaneously. This alternative embodiment comprises the multiple diffractive orders to be used as follows; zero order, reading content information from a pit 232; +/−first order 668/670 reading content information from a pit 232; and and the +/−second orders 672/674 reading tracking information from a coast 234. This alternative embodiment of the present invention can be implemented by focusing the +/−second order diffractive spots 672/674 (unused in prior art optical pickup devices) on the center of the coast 234 between the pit lines, while the first orders scan over the boundary between the pits 232 and the coast 234 as shown in FIG. 7. Alternatively this can be implemented as shown in FIG. 7a where the zero order 666 is focused on a pit 232, the +/first orders 668/670 are focused on the next successive pit 232, and the +/−second orders 672/674 are focused on the next coast 234. This increases the sensitivity of error detection for lateral position and allows reduction of the coast 234 width, thereby allowing a higher storage density. In this embodiment, the overlapping diffractive spots can be differentiated by the intensity modulation means described above in the preferred embodiment. The five resultant diffractive spots would appear on the photodetector as shown in FIG. 7a. Shown in the figure are the zero order diffractive spot 666, the +/−first order diffractive spots 668/670, and the +/−second order diffractive spots 672/674.

Figure 8:
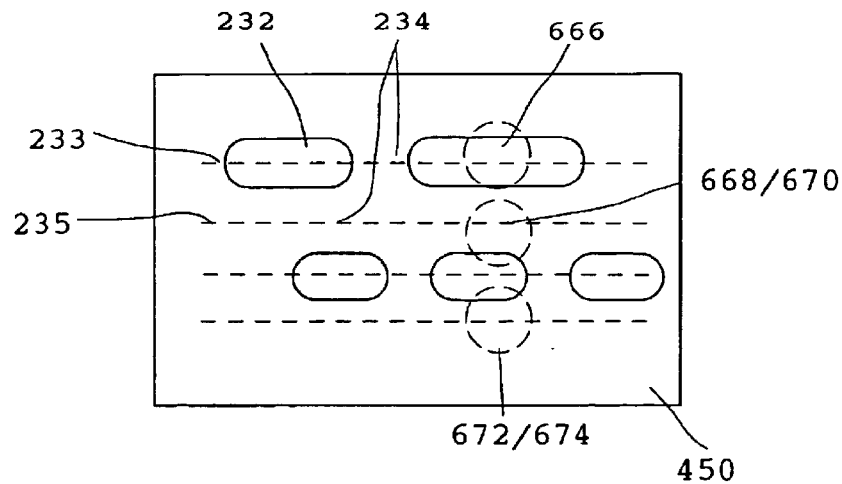
FIG. 8 is a schematic of another alternative implementation of the diffracted laser illumination of the optical storage media.
Figure 8A:
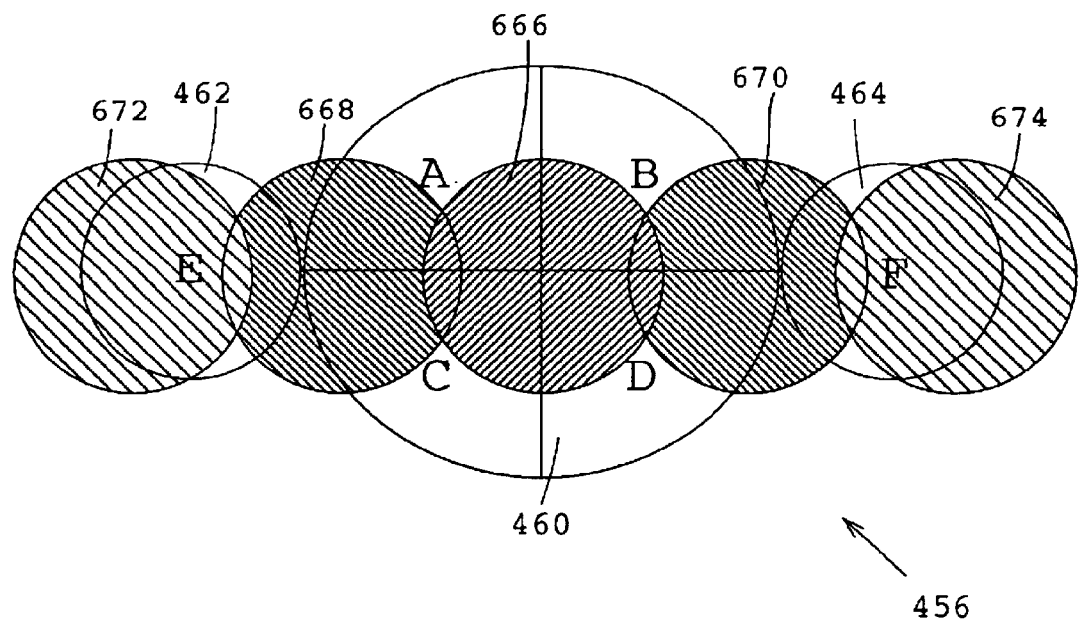
FIG. 8a shows the light distribution on the photodetector corresponding to the preferred embodiment shown in FIG. 8.

Alternatively, the preferred embodiment can be implemented, as shown in FIG. 8. This alternative embodiment comprises the multiple diffractive orders to be used as follows; zero order, reading content information from a pit 232; +/−first order 668/670 reading tracking information from a coast 234; and the +/−second orders 672/674 reading tracking information from a coast 234. This can be implemented by focusing the zero order 666 on a pit 232, first order diffractive spots 668/670 on the coast lines 235 adjacent to the pit line 233, as is done in the prior art, and, focusing the second order diffractive spots 672/674 on the coast lines 235 behind the next pit lines 233. This can obviously be extended to 3-d and higher orders by focusing higher orders on the next successive pit lines 233. The diffracted focal spots would appear on the photodetector array 456 as shown in FIG. 8a. In this embodiment, the overlapping diffractive spots can be differentiated by the intensity modulation means described above in the preferred embodiment. The five resultant diffractive spots would appear on the photodetector as shown in FIG. Ba. Shown in the figure are the zero order diffractive spot 666, the +/−first order diffractive spots 668/670, and the +/−second order diffractive spots 672/674.

Techniques such as these described in these two alternative embodiments can be used to increase the readout speed by addressing multiple pits and/or coasts simultaneously. Shown in these two alternative embodiments are just two implementations of using the higher orders to address and readout multiple sites simultaneously. Obviously, the techniques described above can be used to address any combination of pits and coasts simultaneously, thereby increasing the readout speed.

A more precise way of measuring the output is to measure the phase shift at the modulation frequency between the AC components of the intensity in different diffraction orders. This can allow the application of modulation (carrier frequency) to the readout signal and use phase demodulation of the error signals for tracking and stabilization. The signal of each quadrant of the photodetector 454 is proportional to the brightness of corresponding area on the optical storage media 450 which, in turn, depends on reflectivity of the surface and illumination. When the data storage density is high, the feature sizes on the optical storage media 450 are smaller than the size of a diffraction-limited spot. The illuminating laser spots overlap, and the brightness of the area imaged onto the photodetector 454 results from a sum of intensities of adjacent spots illuminating the surface of the optical storage media 450. Intensities in the different spots will oscillate with the same frequency but with different phase shifts. The phase shifts depend on the voltage applied to the electronically reconfigurable grating 442 and the angle of incidence of light onto the grating 442. The phase of the signal from the photodetector 454 will be a function of intensities and phase shifts of the individual spots, as well as the location of features on the surface of the optical storage media 450 such as coast 234 of the track. For known intensities and phase shifts in the illuminating spots, the position of the coast 234 can be retrieved from the phase of the signal readout at the photodetector 454.

Figure 9:
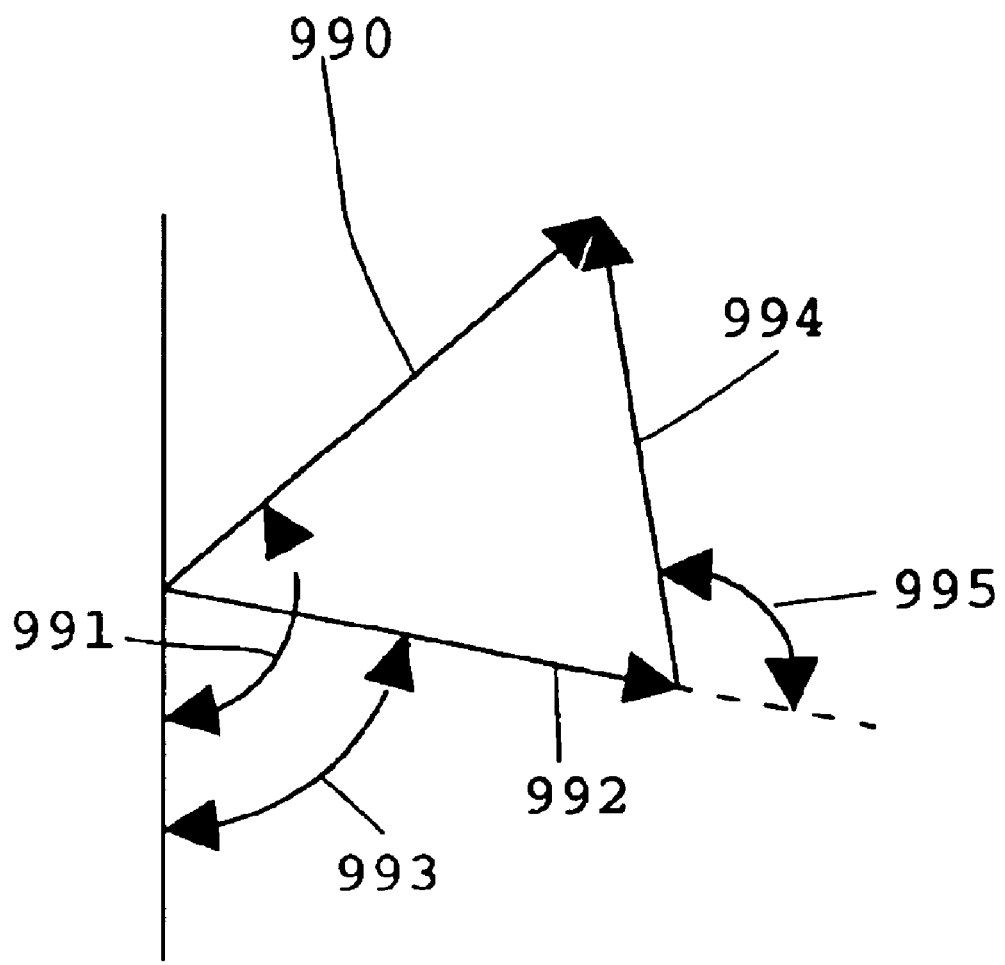
FIG. 9 shows a schematic detailing the phase shift measurement.

The sensitivity of the phase measurement can be demonstrated with reference to the vector diagram in FIG. 9. For example, if the measured intensity of the zero order and the first order are relatively similar, they can be differentiated by measuring their phase shift by the technique described above. The zero order intensity vector 990, with zero order phase angle 991 is added to the first order intensity vector 992 with first order phase angle 993, the resultant intensity vector 994 would have the measurable resultant phase shift 995.

While only certain preferred features of the invention have been illustrated and described, many modifications, changes and substitutions will occur to those skilled in the art. It is, therefore, to be understood that this disclosure and its associated claims are intended to cover all such modifications and changes as fall within the true spirit of the invention.

I claim:

1. An optical pickup apparatus comprising:

an, electronically reconfigurable diffraction grating modulating relative light intensities of at least two different diffraction orders of light diffracted by said electronically reconfigurable diffraction grating;

delivery and focusing optics for focusing said light diffracted by said electronically reconfigurable diffraction grating into diffractive spots corresponding with each of said diffraction orders and delivering said diffracted light onto an optical storage medium, which light is then reflected by said optical storage medium; and a detector for detecting said light reflected by said optical storage medium and striking said detector.

2. The apparatus of claim 1, wherein:

said diffraction orders comprise two diffraction orders comprising zeroth and first diffraction orders;

said delivery and focusing optics causes said diffractive spots corresponding with said zeroth order to partially overlap with said diffractive spots corresponding with said first order; and overlapping light from said zeroth and first diffractive orders striking said detector is resolved into its proper orders by examining the modulation of the intensities of said overlapping light in relation to known modulation frequencies of said zeroth and first diffraction orders by said electronically reconfigurable diffraction grating.

3. The apparatus of claim 1, wherein:

said diffraction orders comprise more than two diffraction orders, comprising zeroth and first diffraction orders, and at least one additional diffraction order higher than said zeroth and first diffraction orders.

4. The apparatus of claim 1, wherein:

said diffraction orders comprise more than two diffraction orders, comprising zeroth and first diffraction orders, and at least one additional diffraction order higher than said zeroth and first diffraction orders;

said delivery and focusing optics causes said diffractive spots corresponding with each said diffraction order to partially overlap with said diffractive spots corresponding with at least a diffraction order adjacent thereto; and overlapping light from said more than two diffractive orders striking said detector is resolved into its proper orders by examining the modulation of intensities of said overlapping light in relation to known modulation frequencies of said more than two diffractive orders by said electronically reconfigurable diffraction grating.

5. The apparatus of claim 1, wherein:

said diffraction orders comprise more than two diffraction orders, comprising zeroth and first diffraction orders, and at least one additional diffraction order higher than said zeroth and first diffraction orders;

said delivery and focusing optics causes said diffractive spots corresponding with each said diffraction order to partially overlap with said diffractive spots corresponding with at least a diffraction order adjacent thereto; and overlapping light from said more than two diffractive orders striking said detector is resolved into its proper orders by examining the modulation of intensities and the phase shift of said overlapping light in relation to known modulation frequencies of said more than two diffractive orders by said electronically reconfigurable diffraction grating.

6. The apparatus of claim 2, wherein:

light from said zeroth order comprises content information from said optical storage medium;

light from said first order comprises tracking information from said optical storage medium.

7. The apparatus of claim 2, wherein:

light from said zeroth order comprises content information from said optical storage medium;

light from said first order comprises content information from said optical storage medium;

light from said second order comprises tracking information from said optical storage medium.

8. The apparatus of claim 2, wherein:

light from said zeroth order comprises content information from said optical storage medium;

light from said first order comprises tracking information from said optical storage medium;

light from said second order comprises tracking information from said optical storage medium.

9. The apparatus of claim 3, wherein:

light from said zeroth order comprises content information from said optical storage medium;

light from said first order comprises content information from said optical storage medium;

light from said second order comprises tracking information from said optical storage medium.

10. The apparatus of claim 3, wherein:

light from said zeroth order comprises content information from said optical storage medium;

light from said first order comprises tracking information from said optical storage medium;

light from said second order comprises tracking information from said optical storage medium.

11. The apparatus of claim 4, wherein:

light from said zeroth order comprises information content from said optical storage medium;

light from said first order comprises content information from said optical storage medium;

light from said second order comprises tracking information from said optical storage medium.

12. The apparatus of claim 4, wherein:

light from said zeroth order comprises content information from said optical storage medium;

light from said first order comprises tracking information from said optical storage medium;

light from said second order comprises tracking information from said optical storage medium.

13. The apparatus of claim 1, wherein:
said electronically reconfigurable diffraction grating comprises a reflection grating.

14. The apparatus of claim 1, wherein:
said electronically reconfigurable diffraction grating Comprises a transmission grating.

15. The apparatus of claim 1, wherein:
said apparatus reads content and tracking information prerecorded on said optical storage medium.

16. The apparatus of claim 1, wherein:
said light striking said photodetector is comprised of at least two individual said diffractive orders;
whereby each individual said diffractive order has measuring properties that comprise said intensity, said frequency of intensity modulation, and said phase;
and whereby said photodetector measures said individual diffractive orders by at least one of said measuring property.

17. The apparatus of claim 2, wherein:
said light striking said photodetector is comprised of; said zero diffractive order with a first set of said measuring properties which comprises a first intensity, a first frequency of intensity modulation, and a first phase; and said first diffractive orders with a second set of said measuring properties which comprises a second intensity, a second frequency of intensity modulation, a second phase;
whereby said first orders may overlap with said zero order on said detector;
and whereby said zero and first orders may be read simultaneously by said detector and differentiated by said detector by any of their individual said measuring properties.

18. The apparatus of claim 2, wherein:
said light striking said photodetector is comprised of; said zero diffractive order with a first set of said measuring properties which comprises a first intensity, a first frequency of intensity modulation, and a first phase; said first diffractive orders with a second set of said measuring properties which comprises a second intensity, a second frequency of intensity modulation, a second phase; and said second diffractive orders with a third set of said measuring properties which comprises a third intensity, a third frequency of modulation and a third phase;
whereby said first orders may overlap with said zero order on said detector, and said second orders may overlap with said first orders on said detector;
and whereby said zero, first and second orders may be read simultaneously by said detector and differentiated by said detector by any of their individual said measuring properties.

19. The apparatus of claim 3, wherein:
said light striking said photodetector is comprised of; said zero diffractive order with a first set of said measuring properties which comprises a first intensity, a first frequency of intensity modulation, and a first phase; and said first diffractive orders with a second set of said measuring properties which comprises a second intensity, a second frequency of intensity modulation, a second phase;
whereby said first orders may overlap with said zero order on said detector;
and whereby said zero and first orders may be read simultaneously by said detector and differentiated by said detector by any of their individual said measuring properties.

20. The apparatus of claim 3, wherein:
said light striking said photodetector is comprised of; said zero diffractive order with a first set of said measuring properties which comprises a first intensity, a first frequency of intensity modulation, and a first phase; said first diffractive orders with a second set of said measuring properties which comprises a second intensity, a second frequency of intensity modulation, a second phase; and said second diffractive orders with a third set of said measuring properties which comprises a third intensity, a third frequency of modulation and a third phase;
whereby said first orders may overlap with said zero order on said detector, and said second orders may overlap with said first orders on said detector;
and whereby said zero, first and second orders way be read simultaneously by said detector and differentiated by said detector by any of their individual said measuring properties.

21. The apparatus of claim 4, wherein:
said light striking said photodetector is comprised of; said zero diffractive order with a first set of said measuring properties which comprises a first intensity, a first frequency of intensity modulation, and a first phase; and said first diffractive orders with a second set of said measuring properties which comprises a second intensity, a second frequency of intensity modulation, a second phase;
whereby said first orders may overlap with said zero order on said detector;
and whereby said zero and first orders may be read simultaneously by said detector and differentiated by said detector by any of their individual said measuring properties.

22. The apparatus of claim 4, wherein:
said light striking said photodetector is comprised of; said zero diffractive order with a first set of said measuring properties which comprises a first intensity, a first frequency of intensity modulation, and a first phase; said first diffractive orders with a second set of said measuring properties which comprises a second intensity, a second frequency of intensity modulation, a second phase; and said second diffractive orders with a third set of said measuring properties which comprises a third intensity, a third frequency of modulation and a third phase;
whereby said first orders may overlap with said zero order on said detector, and said second orders may overlap with said first orders on said detector;
and whereby said zero, first and second orders may be read simultaneously by said detector and differentiated by said detector by any of their individual said measuring properties.

23. A method for reading an optical storage device comprising the steps of:
modulating relative light intensities of at least two different diffraction orders of light diffracted by an electronically reconfigurable diffraction grating;
focusing said light diffracted by said electronically reconfigurable diffraction grating into diffractive spots corresponding with each of said diffraction orders and delivering said diffracted light onto an optical storage medium, which light is then reflected by said optical storage medium; and
detecting said light reflected by said optical storage medium by a detector.

24. The method of claim 23, wherein:

said diffraction orders comprise two diffraction orders comprising zeroth and first diffraction orders;

said diffractive spots corresponding with said zeroth order partially overlaps with said diffractive spots corresponding with said first order; and further comprising, resolving overlapping light from said zeroth and first diffractive orders by said detector into its proper orders by examining the modulation of the intensities of said overlapping light in relation to known modulation frequencies of said zeroth and first diffraction orders by said electronically reconfigurable diffraction grating.

25. The method of claim 23, wherein:

said diffraction orders comprise more than two diffraction orders, comprising zeroth and first diffraction orders, and at least one additional diffraction order higher than said zeroth and first diffraction orders.

26. The method of claim 23, wherein:

said diffraction orders comprise more than two diffraction orders, comprising zeroth and first diffraction orders, and at least one additional diffraction order higher than said zeroth and first diffraction orders;

said diffractive spots corresponding with each said diffraction order partially overlap with said diffractive spots corresponding with at least a diffraction order adjacent thereto; and further comprising resolving overlapping light from said more than two diffractive orders by said detector into its proper orders by examining the modulation of intensities of said overlapping light in relation to known modulation frequencies of said more than two diffractive orders by said electronically reconfigurable diffraction grating.

27. The method of claim 23, wherein:

said diffraction orders comprise more than two diffraction orders, comprising zeroth and first diffraction orders, and at least one additional diffraction order higher than said zeroth and first diffraction orders;

said delivery and focusing optics causes said diffractive spots corresponding with each said diffraction order to partially overlap with said diffractive spots corresponding with at least a resolving overlapping light from said more than two diffractive orders by said detector into its proper orders by examining the modulation of intensities and the phase shift of said overlapping light in relation to known modulation frequencies of said more than two diffractive orders by said electronically reconfigurable diffraction grating.

28. The method of claim 24, said light from said zeroth order comprising content information from said optical storage medium;

said light from said first order comprising tracking information from said optical storage medium.

29. The method of claim 24, said light from said zeroth order comprising content information from said optical storage medium;

said light from said first order comprising content information from said optical storage medium said light from said second order comprising tracking information from said optical storage medium.

30. The method of claim 24, said light from said zeroth order comprising content information from said optical storage medium;

said light from said first order comprising tracking information from said optical storage medium, said light from said second order comprising tracking information from said optical storage medium.

31. The method of claim 25, said light from said zeroth order comprising content information from said optical storage medium;

said light from said first order comprising content information from said optical storage medium said light from said second order comprising tracking information from said optical storage medium.

32. The method of claim 25, said light from said zeroth order comprising content information from said optical storage medium;

said light from said first order comprising tracking information from said optical storage medium;

said light from said second order comprising tracking information from said optical storage medium.

33. The method of claim 26, said light from said zeroth order comprising information content from said optical storage medium;

said light from said first order comprising content information from said optical storage medium;

said light from said second order comprising tracking information from said optical storage medium.

34. The method of claim 26, said light from said zeroth order comprising content information from said optical storage medium;

said light from said first order comprising tracking information from said optical storage medium;

said light from said second order comprising tracking information from said optical storage medium.

35. The method of claim 23, said electronically reconfigurable diffraction grating comprising a reflection grating.

36. The method of claim 23, said electronically reconfigurable diffraction grating comprising a transmission grating.

37. The method of claim 23, said apparatus reads content and tracking information prerecorded on said optical storage medium.

38. The method of claim 23, striking said photodetector with said light further comprising at least two individual said diffractive orders; whereby each individual said diffractive order has measuring properties comprising said intensity, said frequency of intensity modulation, and said phase; and measuring by said photodetector of said individual diffractive orders by utilizing at least one of said measuring property.

39. The method of claim 24, striking said photodetector with said light further comprising;

said zero diffractive order with a first set of said measuring properties comprising a first intensity, a first frequency of intensity modulation, and a first phase; and said first diffractive orders with a second set of said measuring properties comprising a second intensity, a second frequency of intensity modulation, a second phase;

overlapping of said first orders with said zero order on said detector;

reading simultaneously by said detector said zero and said first diffractive orders and differentiating by said detector utilizing any of their individual said measuring properties.

40. The method of claim 24, striking said photodetector with said light further comprising;

said zero diffractive order with a first set of said measuring properties comprising a first intensity, a first frequency of intensity modulation, and a first phase; and said first diffractive orders with a second set of said measuring properties comprising a second intensity, a second frequency of intensity modulation, a second phase; and said second diffractive orders with a third set of said measuring properties comprising a third intensity, a third frequency of modulation and a third phase;

overlapping of said first orders with said zero order on said detector, and overlapping of said second orders on said detector;

reading simultaneously by said detector said zero diffractive order, said first diffractive orders and said second diffractive orders, differentiating by said detector utilizing any of their individual said measuring properties.

41. The method of claim 25, striking said photodetector with said light further comprising;

said zero diffractive order with a first set of said measuring properties comprising a first intensity, a first frequency of intensity modulation, and a first phase; and said first diffractive orders with a second set of said measuring properties comprising a second intensity, a second frequency of intensity modulation, a second phase;

overlapping of said first orders with said zero order on said detector;

reading simultaneously by said detector said zero and said first diffractive orders and differentiating by said detector utilizing any of their individual said measuring properties.

42. The method of claim 25, striking said photodetector with said light further comprising;

said zero diffractive order with a first set of said measuring properties comprising a first intensity, a first frequency of intensity modulation, and a first phase; and said first diffractive orders with a second set of said measuring properties comprising a second intensity, a second frequency of intensity modulation, a second phase; and said second diffractive orders with a third set of said measuring properties comprising a third intensity, a third frequency of modulation and a third phase;

overlapping of said first orders with said zero order on said detector, and overlapping of said second orders on said detector;

reading simultaneously by said detector said zero diffractive order, said first diffractive orders and said second diffractive orders, differentiating by said detector utilizing any of their individual said measuring properties.

43. The method of claim 26, striking said photodetector with said light further comprising;

said zero diffractive order with a first set of said measuring properties comprising a first intensity, a first frequency of intensity modulation, and a first phase; and said first diffractive orders with a second set of said measuring properties comprising a second intensity, a second frequency of intensity modulation, a second phase;

overlapping of said first orders with said zero order on said detector;

reading simultaneously by said detector said zero and said first diffractive orders and differentiating by said detector utilizing any of their individual said measuring properties.

44. The method of claim 26, striking said photodetector with said light further comprising;

said zero diffractive order with a first set of said measuring properties comprising a first intensity, a first frequency of intensity modulation, and a first phase; and said first diffractive orders with a second set of said measuring properties comprising a second intensity, a second frequency of intensity modulation, a second phase; and said second diffractive orders with a third set of said measuring properties comprising a third intensity, a third frequency of modulation and a third phase;

overlapping of said first orders with said zero order on said detector, and overlapping of said second orders on said detector;

reading simultaneously by said detector said zero diffractive order, said first diffractive orders and said second diffractive orders, differentiating by said detector utilizing any of their individual said measuring properties.

45. A method for detecting and interpreting light signals striking a detector of an optical pickup apparatus, comprising the steps of:

causing said light signal to strike said detector in a manner that comprises at least two individual diffractive orders diffracted by an electronically reconfigurable diffraction grating, whereby each said individual diffractive order is possessing individual measuring properties comprising an intensity, an intensity modulation and a phase;

interpreting said light signal striking said detector by reading said individual measuring properties of each said individual diffractive order and extracting content or tracking information.

* * * * *